United States Patent [19]

Iiyama et al.

[11] 4,179,407

[45] Dec. 18, 1979

[54] CATALYST BED FOR USE IN DECOMPOSITION OF AMMONIA GAS

[75] Inventors: Kiyotaka Iiyama; Takeshi Matsui, both of Yokohama; Shigeru Kusakata, Kawasaki; Hideo Watanabe, Yokohama; Michihisa Takahashi, Tachikawa, all of Japan

[73] Assignee: Ricoh Co., Ltd., Tokyo, Japan

[21] Appl. No.: 909,696

[22] Filed: May 25, 1978

Related U.S. Application Data

[63] Continuation of Ser. No. 768,026, Feb. 14, 1977, abandoned.

[30] Foreign Application Priority Data

Feb. 20, 1976 [JP] Japan .................................. 51-17037

[51] Int. Cl.² .......................... B01J 21/18; B01J 29/06

[52] U.S. Cl. ................................ 252/446; 252/455 R; 252/455 Z; 252/460; 252/466 PT; 423/351

[58] Field of Search ............... 423/237, 351, 403, 239; 252/455 R, 455 Z, 466 PT, 460, 446, 477 R

[56] References Cited

U.S. PATENT DOCUMENTS

| | | | |
|---|---|---|---|
| 2,601,221 | 6/1952 | Rosenblatt et al. | 423/351 X |
| 3,467,491 | 9/1969 | Hardison | 252/466 B |
| 3,617,521 | 11/1971 | Houston et al. | 252/466 PT |

*Primary Examiner*—Carl F. Dees
*Attorney, Agent, or Firm*—Blanchard, Flynn, Thiel, Boutell & Tanis

[57] ABSTRACT

Catalyst bed for use in decomposition of ammonia gas, which comprises a mixture of catalysts for use in decomposition of ammonia gas and granules of catalytically inert substances.

5 Claims, 3 Drawing Figures

CATALYST BED FOR USE IN DECOMPOSITION OF AMMONIA GAS

This is a continuation of application Ser. No. 768,026, filed Feb. 14, 1977, now abandoned.

BACKGROUND OF THE INVENTION

It is well known that ammonia gas can be decomposed by contacting a mixture of ammonia gas and air with a catalyst, for example, made of platinum at an elevated temperature.

The catalysts for use in the decomposition of ammonia are platinum metals such as platinum, rhodium, ruthenium or alloys thereof carried on a round spherical type base of alumina, silica, zeolite, kaolin or silicon carbide having a diameter of 2 mm to 10 mm and having 0.05% to 1.0% by weight of Pt, Rh, Ru or alloy thereof on the base.

The decomposition of ammonia is oxidation thereof and is carried out at a temperature of higher than 180° C. to convert same to nitrogen and water. During the composition of ammonia gas, however, noxious nitrogen oxides (NOx), which are harmful, are ordinarily produced, because NOx are increasingly produced at a temperature of higher than 250° C., especially higher than 300° C., and the decomposition of ammonia is an exothermic reaction accompanied with calorific value of 76.2 kcal/mol, and therefore, as the decomposition proceeds, the temperature of the air containing ammonia gas to be decomposed rises, for example, to a temperature of higher than 300° C. The production of NOx increases progressively as the temperature rises.

The production of NOx can be prevented by maintaining the temperature of the air containing ammonia gas to be decomposed as low as possible in a temperature of higher than 180° C., for example, in a range of from 200° C. to 230° C.

A method of catalytic treatment of gases containing ammonia has been disclosed in U.S. Pat. No. 3,467,491. In this patent, there is shown a method comprising passing a mixture of ammonia gas and air into contact with a platinum-alumina catalyst at a controlled temperature range of from about 400° F. (200° C.) to about 450° F. (230° C.) to effect a conversion to nitrogen and water without production of noxious nitrogen oxides (NOx). In the above U.S. patent, there is not provided a method controlling the temperature of the ammonia-containing air on decomposition. It is an object of the present invention to provide a catalyst bed in which the temperature of the ammonia-containing air to be subjected to catalytic action is controlled to minimize the amount of noxious nitrogen oxides produced on decomposition of ammonia gas to nitrogen and water.

SUMMARY OF THE INVENTION

The present invention relates to a catalyst bed for use in decomposition of ammonia gas to nitrogen and water with low production of noxious nitrogen oxides.

The catalyst bed of the present invention comprises a mixture of catalysts for use in decomposition of ammonia gas and granules or catalytically inert substances.

The typical catalysts include platinum metals such as platinum, rhodium, ruthenium or alloys thereof carried on a round spherical type base of alumina, silica, zeolite, kaolin or silicon carbide having a diameter of 2 mm to 10 mm and having 0.05% to 1.0% by weight of Pt, Rh, Ru or alloys thereof on the base.

The granules of catalytically inert substance include alumina, silica, zeolite, kaolin, silicon carbide, catalytically inert metals and metal oxides having a diameter of 2 mm to 10 mm. Said metals are, for example, aluminum and stainless steel. Said metal oxides are, for example, zinc oxide, titanium oxide and the like.

Instead of the granules of the inert substance rings of the inert substance such as "Raschig rings" may be used.

The catalyst bed comprises one part by weight of the catalyst and from 0.2 to 10 parts by weight of the catalytically inert granules.

The sizes of the catalysts and the inert granules and the proportion of them may be determined dependent on the amount of ammonia contained in gas to be treated and the space velocity and the linear velocity of the gas in the catalyst bed.

The production of noxious nitrogen oxides on decomposition of ammonia gas can be reduced by using the catalyst bed of the present invention, which will be illustrated in the following Example.

DESCRIPTION OF THE PREFERRED EMBODIMENTS

For the purpose of making clear the present invention, a prior art method and then the present invention are illustrated with reference to the accompanying drawings.

Figure 1:
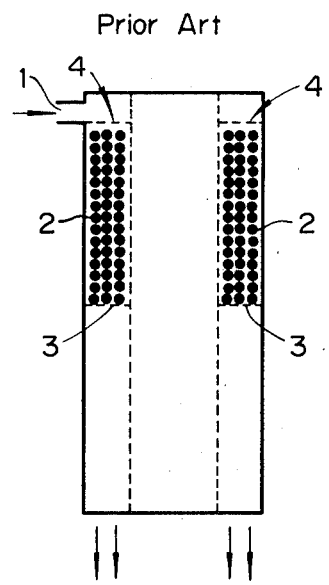
FIG. 1 is a schematic cross-sectional view of a reactor containing a prior art catalyst bed.

Referring now to FIG. 1, there is indicated a cross-sectional view of a conventional catalyst bed. A catalyst housing consists of a hollow cylinder having an outside diameter of 6 cm and an inside diameter of 3 cm. The catalyst housing (cylinder) has an inlet 1 for flowing in a mixture of ammonia gas and air. Catalyst 2 fills the cylinder and is supported on a screen (perforated plate) 3 so that the catalyst bed 4 had a thickness of about 24 cm and a volume of about 500 cc. Said catalyst consists of platinum carried in an amount of 0.5% by weight on a round spherical base of alumina having a diameter of 4 mm to 6 mm. Air containing 4% of ammonia gas, preheated at a temperature of about 230° C., was passed through the catalyst bed 4 in an amount of 100 liters per minute. The space velocity (SV) and the linear velocity (LV) of said ammonia-containing air in the catalyst bed 4 are 12,000 hr$^{-1}$ and 0.67 m/sec, respectively. The ammonia-containing air undergoes catalytic action to decompose ammonia and then is exhausted downwards from the catalyst housing. During the operation, the housing was air-cooled from the outside. In this case, the maximum temperature of the ammonia-containing air in the catalyst bed 4 was 385° C. and the temperature of the exhaust at the outlet was about 300° C., and the concentrations of ammonia (NH$_3$) and noxious nitrogen oxides (NOx) in the exhaust were 200 ppm and 3,500 ppm, respectively.

Figure 2:
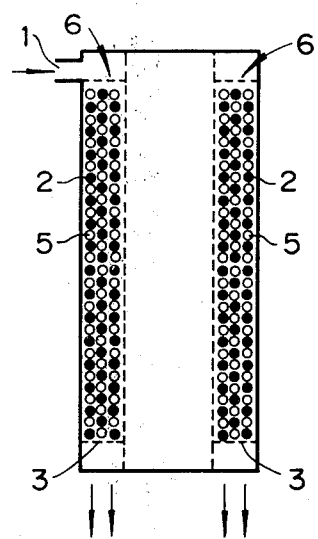
FIG. 2 is a schematic cross-sectional view of a reactor containing a catalyst bed according to the invention.

Referring now to FIG. 2, the present invention is illustrated below:

A mixture of one part by weight of platinum catalyst 2 carried on alumina bases and one part by weight of catalytically inert alumina granules 5 were filled in the cylinder and supported on a screen 3 so that the catalyst bed 6 had a thickness of about 48 cm and a volume of about 1,000 cc. Said alumina base and granules have diameter of from 4 mm to 6 mm.

The same operation as that shown above was repeated to pass ammonia-containing air through the catalyst bed 6. In this case, the space velocity (SV) and the linear velocity (LV) of said ammonia-containing air in the catalyst bed 6 are 6,000 hr$^{-1}$ and 0.67 m/sec, respectively. The maximum temperature of the ammonia-containing air in the catalyst bed 6 was 295° C. and the temperature of the exhaust gas at the outlet was about 230° C., and the concentrations of ammonia (NH$_3$) and noxious nitrogen oxide (NOx) in the exhaust were 25 ppm and 160 ppm, respectively.

In the catalyst housing of FIG. 2, the same operation as that shown above was repeated except that silicon carbide base and granules were used instead of alumina base and granules. In this case, the concentrations of NH$_3$ and NOx in the exhaust were 25 ppm and 150 ppm, respectively.

As can be seen from the results shown above, ammonia gas can be decomposed while minimizing the amount of noxious nitrogen oxides produced by using a catalyst bed comprising a mixture of catalysts for use in decomposition of ammonia gas and granules of catalytically inert substances.

The catalytically inert granules have preferably a size similar to that of the catalysts. However, as described hereinbefore, said size is determined dependent on the desired space velocity and linear velocity of the ammonia-containing air, and said inert granules are usually used in an amount of from 0.2 to 10 parts by weight based on the amount of the catalysts.

Figure 3:
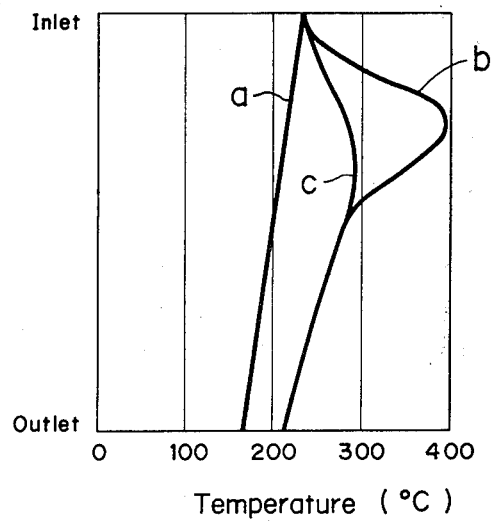
FIG. 3 is a diagram indicating the variation of air temperature along the length of the reactor under various conditions of operation.

In FIG. 3, Curve a shows the temperature of air at each point in the catalyst housing represented by FIG. 1, in which said air (not containing ammonia) has been preheated at a temperature of 230° C. and passed through the catalyst bed of FIG. 1, in an amount of 100 l per minute. During the operation, the catalyst housing is air-cooled from the outside.

Curve b shows the temperature of 4% ammonia-containing air at each point in the catalyst bed represented by FIG. 1, in which said ammonia-containing air has been preheated and passed through in the same manner as that shown above.

Curve c shows the temperature of 4% ammonia-containing air at each point in the catalyst bed of the present invention represented by FIG. 2, in which said ammonia-containing air has been preheated and passed through in the same manner as that shown above.

As can be seen from Curves b and c, the rise of the temperature of ammonia-containing air to be subjected to the catalytic action can be prevented by using the catalyst bed of the present invention.

We claim:

1. A catalyst bed for use in oxidizing ammonia gas, said catalyst bed consisting essentially of a mixture of (1) one part by weight of granules carrying catalyst effective for catalyzing oxidation of ammonia gas by air, at an elevated temperature higher than 180° C., to oxidize said ammonia gas into nitrogen gas and water vapor, said granules carrying catalyst consisting essentially of particles in which at least one catalyst material selected from the group consisting of platinum, rhodium, ruthenium and alloys thereof is carried on round spherical bases made of a carrier material selected from the group consisting of alumina, silica, zeolite, kaolin and silicon carbide, said bases having a diameter of from 2 mm to 10 mm and carrying from 0.05% to 1.0% by weight of said catalyst material, and (2) from 0.2 to 10 parts by weight of granules consisting of catalytically inert substance which inert substance does not catalyze reaction of the ammonia gas and is effective to maintain the maximum temperature of ammonia gas flowing through the catalyst bed at a level such that generation of nitrogen oxides is minimized, said granules of catalytically inert substance consisting of at least one substance selected from the group consisting of alumina, silica, zeolite, kaolin, silicon carbide, catalytically inert metals and metal oxides, said granules of catalytically inert substance having a diameter of from 2 mm to 10 mm.

2. A catalyst bed according to claim 1 in which each of said carrier material and said catalytically inert substance is selected from the group consisting of alumina and silicon carbide.

3. A catalyst bed according to claim 1 in which each of said carrier material and said catalytically inert substance is alumina.

4. A catalyst bed according to claim 1 in which each of said carrier material and said catalytically inert substance is silicon carbide.

5. A catalyst bed according to claim 1 which has been prepared by adding the granules (2) consisting of catalytically inert substance, to the granules (1) carrying catalyst, and mixing granules (2) with granules (1) to form said mixture, said granules (2) having a size similar to the size of granules (1).

* * * * *